US006286417B1

United States Patent
Bichsel

(10) Patent No.: US 6,286,417 B1
(45) Date of Patent: Sep. 11, 2001

(54) DRUM COOKER

(76) Inventor: Rudolf Bichsel, Gyrisbergstrasse 124, CH-3400 Burgdorf (CH)

(*) Notice: Subject to any disclaimer, the term of this patent is extended or adjusted under 35 U.S.C. 154(b) by 0 days.

(21) Appl. No.: 09/658,478

(22) Filed: Sep. 8, 2000

Related U.S. Application Data

(63) Continuation of application No. PCT/EP99/00796, filed on Feb. 6, 1999.

(51) Int. Cl.$^7$ .............................. A23L 1/00; A23L 3/00; A47J 27/00; A47J 37/12; A23N 12/00
(52) U.S. Cl. ............................. 99/330; 99/348; 99/352; 99/355; 99/409; 366/101; 366/220
(58) Field of Search .................... 99/325, 330, 348, 99/352–355, 360, 365, 403–409, 450, 470, 483, 485, 486, 487, 516, 517, 534, 536, 477–479, 443 R, 443 C; 366/81, 91, 101–107, 220–236

(56) References Cited

U.S. PATENT DOCUMENTS

| 1,231,002 | * | 6/1917 | Steere | 134/132 |
| 1,290,396 | * | 1/1919 | Steere | 134/132 |
| 1,806,957 | * | 5/1931 | Stocking | 134/132 |
| 2,166,197 | * | 7/1939 | Schaub | 366/322 |
| 2,314,871 | * | 3/1943 | DeBack | 134/65 |
| 2,909,872 | * | 10/1959 | Kearney et al. | 134/132 |
| 3,135,668 | * | 6/1964 | Wesson | 134/132 |
| 3,484,360 | * | 12/1969 | Sandrock | 366/234 |
| 3,760,714 | * | 9/1973 | Lortz | 99/404 |
| 4,203,358 | | 5/1980 | Vogt . | |
| 4,335,649 | | 6/1982 | Velasco, Jr. et al. . | |
| 4,410,553 | * | 10/1983 | McGinty | 99/348 |
| 4,906,104 | * | 3/1990 | Nishise et al. | 366/322 |
| 5,329,842 | * | 7/1994 | Zittel | 99/348 |
| 5,429,041 | * | 7/1995 | Zittel | 99/470 X |

FOREIGN PATENT DOCUMENTS 06062968   3/1994   (JP) .

OTHER PUBLICATIONS

XP–002108205–Rotary Cereal Cooker, 1999; 1–page.

* cited by examiner

Primary Examiner—Timothy F. Simone
(74) Attorney, Agent, or Firm—Harness, Dickey & Pierce, P.L.C.

(57) ABSTRACT

A drum cooker for cooking granular products comprises a vessel mounted to rotate about an axis. At least two nozzle groups are provided opening into said vessel. One of said nozzle groups is arranged in that it opens into a first area of said vessel covered by that granular product. A second nozzle group opens into a second area of said vessel not covered by said granular product. For enhancing the quality of the cooking process, a control means is provided for supplying said gaseous heat-carrying medium at any time to said nozzle group only that opens into that first area covered by said product.

6 Claims, 2 Drawing Sheets

DRUM COOKER

CROSS-REFERENCE OF PENDING APPLICATION

This application is a continuation of pending International Application PCT/EP99/00796 filed on Feb. 06, 1999.

BACKGROUND OF THE INVENTION

The present invention relates to a drum cooker for cooking granular products, especially corn grits for the production of cornflakes, having a vessel mounted to rotate about an axis with nozzles that open into the vessel and that are connected with lines through which a gaseous heat-carrying medium can be introduced into the vessel, there being provided at least two circumferentially distributed nozzles so that at least one nozzle opens into the area covered by the product while at least one nozzle opens into the area not covered by the product.

A drum cooker of this type is known, for example, under the designation DSCK from Gebr. Bühler AG, Uzwil, Switzerland.

A comparable drum cooker is also known from APV Baker, Peterborough, England, under the designation "Rotary cereal cooker".

The axis of the rotary vessel extends horizontally, the vessel as such has a substantially barrel-shaped contour. Inside the vessel, the product to be treated, for example corn grits, is mixed with water, the vessel being filled with that product-water mixture up to more than half its volume.

The heat supply is realized by nozzles arranged in the wall of the vessel, that are supplied with a hot gaseous medium, namely hot water steam, through lines extending along the outside of the vessel. The arrangement of the nozzles is such that the nozzle groups are located substantially diametrically opposite one to the other. All lines and/or nozzle groups are supplied form a common supply source via communicating lines. This means that the steam is supplied to all lines and all nozzles simultaneously.

In practical use it has, however, been found that the steam enters the interior of the vessel only through those nozzles that open into the area not covered by the product-water mixture at that time. These are the nozzles that occupy a position above the product-water mixture during the rotary movement.

Those nozzles that open into the area just covered by the product-water mixture hardly admit any steam since the counterpressure of the product-water mixture present in the vessel is so high as to prevent the steam from entering through those nozzles in any quantity worth mentioning.

This is due to the fact that the gas, being supplied simultaneously via all lines, tends to follow the line of least resistance, which is through the nozzles that are not immersed in the product-water mixture.

Even increasing the pressure does not cause the gas to enter through the nozzles in the area covered by the product.

This now leads to the effect that very poor heat transmission is achieved from the admitted heat-carrying medium to the product-water mixture revolving in the vessel, i.e. the mixture of water and the corn grits to be treated. The heat exchange occurs substantially at the surface of the product, which in revolving condition has a kidney-shaped cross-section, and the upper steam-filled space.

However, since it is necessary to continuously supply fresh heat-carrying medium for the cooking process, additional arrangements must be provided for carrying off the gaseous medium from the vessel, which is effected through openings arranged above the product-water mixture. This then creates the risk that fresh medium is carried off without a considerable heat exchange having taken place with the revolving product-water mixture.

This is connected with the considerable disadvantage that very long cooking times are necessary, with the risk that the starch shows gelatinizing phenomena in the outer areas of the corn grains, that have been cooked for a long time, while inside the grain the cooking process has not yet led to the desired result, so that a so-called "white spot" of uncooked starch is still left.

During further processing, this then leads to the result that after the grains have been rolled to flakes, these contain nongelatinized spots. The roasting process that follows then leads to cornflakes which exhibit pale discoloring in the area not thoroughly cooked (white spot), and which instead of containing the desired blisters, exhibit in this area a baked structure, i.e. a closed structure similar to puff pastry.

With respect to energy balance, this cooking process is extremely unfavorable.

It is, therefore, the object of the present invention to improve a drum cooker of the before-mentioned kind so that an efficient heat exchange and/or cooking process takes place that leads to reduced cooking times and by which, in addition, a good and uniform cooking result is achieved.

SUMMARY OF THE INVENTION

This object is achieved by the invention due to the fact that a control means is provided which ensures that the medium will be supplied at any time to those nozzles only that open into the area covered by the product.

This feature provides the advantage that the gaseous medium is now exclusively introduced through the nozzles that open into the area covered by the product, i.e. that are located below the water level so that the medium is blown directly into the water where it gets into intimate heat-exchanging relationship with both the water and the product to be treated.

This positive control results in much more purposeful, quicker and more effective heat transmission which leads to a uniform and excellent cooking result in considerably less time. The medium being introduced enters the product-water mixture to be heated through the nozzles in the form of uniformly distributed bubbles.

The purposeful introduction of the medium into the product-water mixture allows the vessel to be filled to a considerably higher level so that much more product can be treated with the same overall drum size. A voluminous pressure cushion, as required in equipment of the prior art, is now no longer necessary, the steam space serving exclusively venting purposes.

According to a further embodiment of the invention, the design of the control means is such that the vessel can be vented via those nozzles that open at any time into the area not covered by the product.

This features provides the additional considerable advantage that the heat-carrying medium is guided through the vessel very directly and uniformly, that it enters the product-water mixture directly, f lows through the mixture and is evacuated from the vessel through those nozzles which at that time are located above the product-water mixture level.

This permits the pressure build-up in the cooker to be adjusted in an easy way.

The nozzles, therefore, act as injection nozzles in the immersed condition and as venting nozzles when they are located above the water level.

According to a further embodiment of the invention, diametrically opposite nozzles are provided.

This feature, which is known as such, provides the advantage under control aspects that switching-over operations can be effected in a purposeful and simple way so that in a given angular area a nozzle works in the injection mode while in the next defined angular area it works in the venting mode.

According to a further embodiment of the invention, a plurality of nozzles are arranged along the axis of rotation of the vessel.

This feature provides the advantage, especially in the case of very large drum cookers, that the plurality of nozzles permit the heat-carrying medium to be injected at a plurality of positions so that especially uniform and quick heat distribution is guaranteed.

According to a still further embodiment of the invention, the control means comprises a multiple line distribution through which media are guided into and out of the vessel.

Multiple line distributions designed as stationary units for supplying a plurality of media separately into a rotating vessel, are commercially available (for example WEHBERG GmbH, Hagen, Germany) as complete compact units so that a simple and little complex control system can be realized.

Such a multiple line distribution allows not only the heat-carrying medium to be introduced and carried off, but also the water in which the corn grits are cooked and, if desired, even flavor agents and dulcifiants to be gradually added, for example. Additionally, line distributions for rinsing media may be provided so that after draining of the drum cooker a cleaning operation may also be carried out through the control means.

BRIEF DESCRIPTION OF THE DRAWINGS

The invention will now be described and explained in more detail with reference to a selected exemplary embodiment in connection with the attached drawings, in which.

DETAILED DESCRIPTION OF A PREFERRED EMBODIMENT

Figure 1:
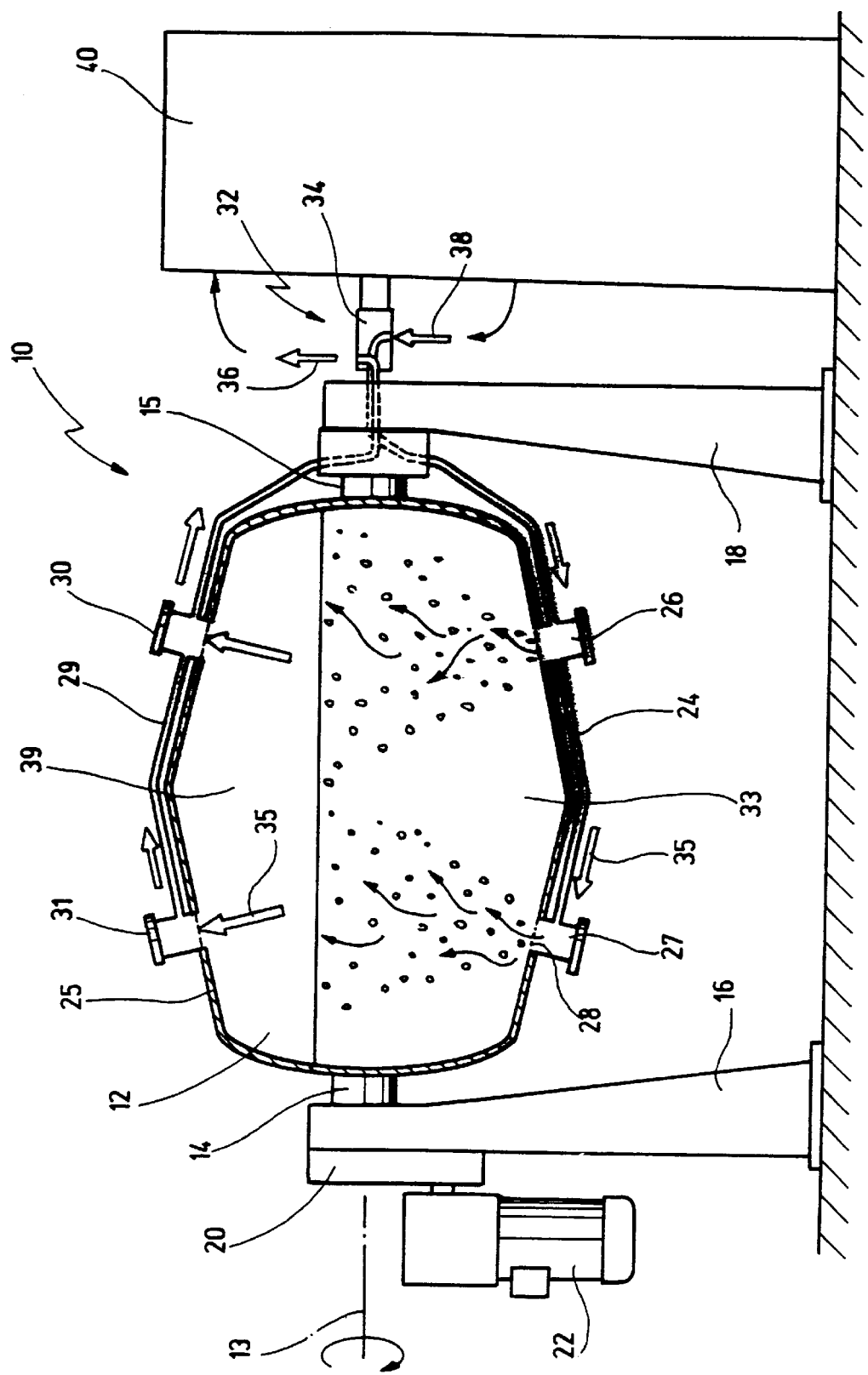
FIG. 1 shows a very diagrammatic view, partly sectioned, of a drum cooker.

A drum cooker shown in FIG. 1 is indicated generally by reference numeral 10.

The drum cooker 10 comprises a horizontal, essentially barrelshaped vessel 12 that can rotate about a horizontal axis of rotation 13.

The vessel 12 is rotatably seated in columns 16 and 18, via lateral bearings 14, 15. The vessel is driven for rotary movement about an axis of rotation 13 via a chain drive 20 connected with a drive motor 22.

A first line 24 is guided along a surface line on the outside of the vessel 12 and connects two nozzles 26 and 27 that open into the interior of the vessel 12. Each nozzle 26, 27 is provided with a filter 28.

Diametrically opposite to that line and nozzle arrangement a further line is guided along the outside for supplying two nozzles 30 and 31, likewise opening into the vessel 12.

Both lines 24 and 29 end in a control means 32 provided with a multiple line distribution 34.

The control means 32 is connected with a supply and control unit 40 through which the media and control operations, which will be described in more detail further below, are supplied and/or controlled.

The vessel 12 is provided with a lid, not shown, through which the product to be treated, for example corn grits, can be filled in and/or discharged.

Corn grits are corn grains from which the germs and shells have been removed.

In addition to the corn grits, water is filled into the vessel 12 up to a level considerably above the level of the axis of rotation 13, as indicated in FIG. 1.

For cooking the water and corn grit mixture contained in the vessel 12, hot steam is introduced at approximately 120° C. and a pressure of approximately 1 to 2 bar.

According to the invention, the system is switched and/or controlled via the control means 32 in a manner such that the medium 35 is at any time introduced only through the line that supplies those nozzles that open into the area 33 covered by the product.

In the representation of FIG. 1, it is the line 24 that supplies the nozzles 26 and 27.

Thus, the medium 35 is introduced via the supply line 38, the control means 32, which for this purpose comprises a multiple line distribution, to the line 24 and from there to the nozzles 26 and 27. The medium 35 then enters the product via the filters 28 in very finely distributed bubbles, as indicated in FIG. 1 by the flow arrows and the bubbles. This permits intimate, quick and uniform heat transmission from the medium 35 to the product-water mixture contained in the vessel 12. Once the medium 35 has passed the mixture, i.e. left the liquid volume, it flows to the diametrically opposite nozzles 30 and 31 and can be discharged from the vessel 12 through the nozzles 30 and 31 and the line 29. The line 29, therefore, carries the medium through the multiple line distribution 34 to a venting opening 36.

In the position illustrated in FIG. 1, which corresponds to an instantaneous condition of the rotating drum cooker 10, the nozzles 26 and 27 therefore work in an injection mode, while the nozzles 30 and 31 work in a venting mode. This situation is maintained so long as the nozzles 26 and 27 open into the area 33 covered by the product. Once the nozzles 26 and 27 have left that area, they are again switched to the venting mode; in the meantime, the nozzles 30 and 31 have reached the area 33 covered by the product and are switched over from the venting mode to the injection mode, which is effected automatically and under positive control by the multiple line distribution 34 of the control means 32. It is thus possible to convert a granular product, for example the corn grits 42, to the desired cooked state within short time.

Compared with the comparable prior art apparatuses of the kind described at the outset, i.e. of equal size and volume throughput, where the treating times are in the range of 120 to 150 minutes, a reduction of the treating time by 20 to 30% could be achieved. In addition to achieving a reduction in treating time, a perfectly cooked product was obtained already after that short treating time. Further, the charge can be increased by approximately 20% as compared with conventional drum cookers.

Figure 2:
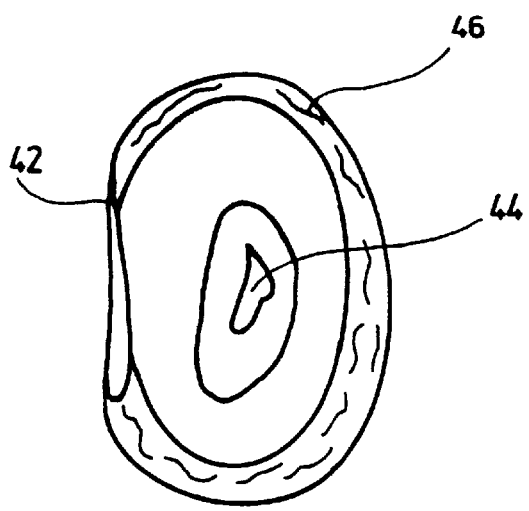
FIG. 2 shows a representation of a corn grit to be treated.

FIG. 2 shows a corn grit 42 as it is obtained when the cooking process is conducted for an excessively long time and with insufficient heat exchange.

The resulting grit exhibits outer areas 46, where the starch has already gelatinized due to the long treating time, i.e. where a sticky outer layer has been produced.

The inner core has not yet been cooked at all, i.e. there still exists the so-called white spot 44.

Figure 3:
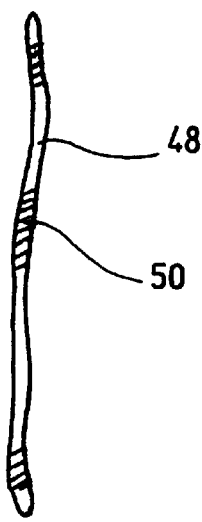
FIG. 3 shows another processing step of such a grit, after it has been pressed between rollers.
Figure 5:
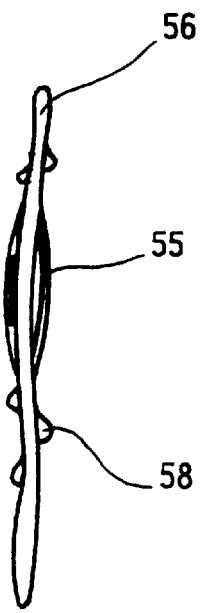
FIG. 5 shows a cornflake as it results from corn grit not uniformly cooked.

If such a grit 42 is then subjected to further treatment, i.e. pressed between rollers, the flake 48 obtained, as illustrated in FIG. 3, contains areas 50 that are still uncooked. When such a flake is then roasted to obtain the desired cornflake, one obtains the cornflake 56 as illustrated in FIG. 5, which exhibits in the incompletely cooked areas a surface 55 with a baked structure similar to puff pastry. The cornflake 56 shows an undesirable pale discoloring in these areas.

The desired blisters 58 are produced in small numbers only.

Figure 4:
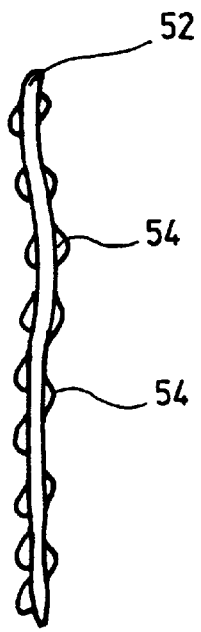
FIG. 4 shows a finished cornflake, in the desired form.

With the aid of the drum cooker 10 equipped according to the invention, it is now possible to produce a corn grit that is cooked thoroughly, much more uniformly and more quickly so that it exhibits neither any sticky outer areas 46, nor a white spot 44 in its inner core. such a uniformly treated corn grit is then further proceed, a cornflake 52, as illustrated in FIG. 4, is obtained after the roasting process which exhibits fine, small blisters 54 uniformly distribution over its surface.

For the sake of clarity, the lid and also the additional supply lines, for example for introducing syrup or cleaning water or the like, have been omitted in FIG. 1; these lines can be suitably guided along the outside of the vessel.

What we claim is:

1. A drum cooker for cooking granular products, comprising:

a vessel mounted to rotate about an axis;

at least two nozzle groups opening into said vessel;

each of said nozzle groups being connected to supply lines;

a gaseous heat-carrying medium is feedable via said supply lines and said nozzle group into said vessel;

said at least two nozzle groups are arranged circumferentially distributed one to another, in a manner that a first nozzle group opens into a first area of said vessel covered by said granular product contained in said vessel, while a second nozzle group opens into a second area of said vessel not covered by said granular product contained in said vessel, wherein a control means is provided for supplying said gaseous heat-carrying medium at any time to that nozzle group only that opens into said first area covered by the product.

2. The drum cooker of claim 1, wherein said control means is designed in that said vessel can be vented via said second nozzle group opening into said second area not covered by said product.

3. The drum cooker of claim 1, wherein said at least two nozzle groups are arranged diametrically opposite one to another.

4. The drum cooker of claim 1, wherein each nozzle group has a plurality of nozzles arranged along a direction of said axis of rotation of said vessel.

5. The drum cooker of claim 1, wherein said control means comprises a multiple line distribution through which media can be separately guided into and out of said vessel.

6. The drum cooker of claim 1, wherein said granular product are corn grits for the production of cornflakes.

* * * * *